United States Patent [19]

Klein et al.

[11] Patent Number: 4,694,257

[45] Date of Patent: Sep. 15, 1987

[54] PHASE-COHERENT DEMODULATION CLOCK AND DATA RECOVERY

[75] Inventors: Michael T. Klein, Ann Arbor, Mich.; Donald J. Voss, Phoenix, Ariz.

[73] Assignee: Motorola, Inc., Schaumburg, Ill.

[21] Appl. No.: 875,038

[22] Filed: Jun. 17, 1986

[51] Int. Cl.$^4$ .............................................. H03D 3/18
[52] U.S. Cl. ...................................... 329/50; 329/110; 375/82
[58] Field of Search ......................... 329/50, 110, 145; 375/75, 78, 80, 81, 82; 455/334, 337

[56] References Cited

U.S. PATENT DOCUMENTS 4,592,072  5/1986  Stewart ............................. 375/82 X
4,628,271  12/1986  Takayama ............................. 329/50

Primary Examiner—Eugene R. Laroche
Assistant Examiner—Robert J. Pascal
Attorney, Agent, or Firm—Dale E. Jepsen

[57] ABSTRACT

A circuit and method for demodulation of transmitted phase-coherent signals including recovery of the clock and data signals associated therewith. A clock recovery circuit detects a zero crossing of the transmitted signal which occurs every one-half period of the lowest frequency transmitted signal. A data recovery circuit detects the presence or absence of a zero crossing during a window portion of each one-half period of the lowest frequency transmitted signal.

7 Claims, 4 Drawing Figures

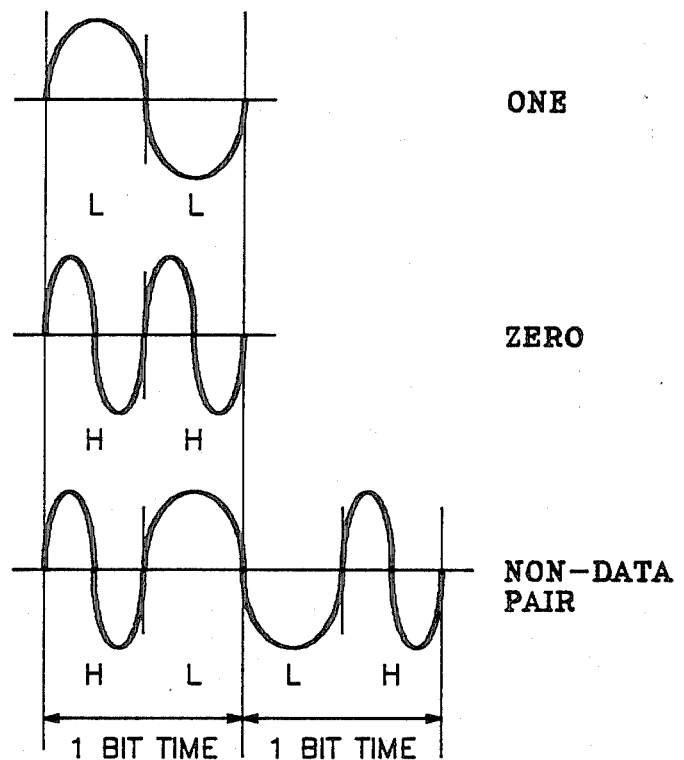
FIG. 1
FIG. 2
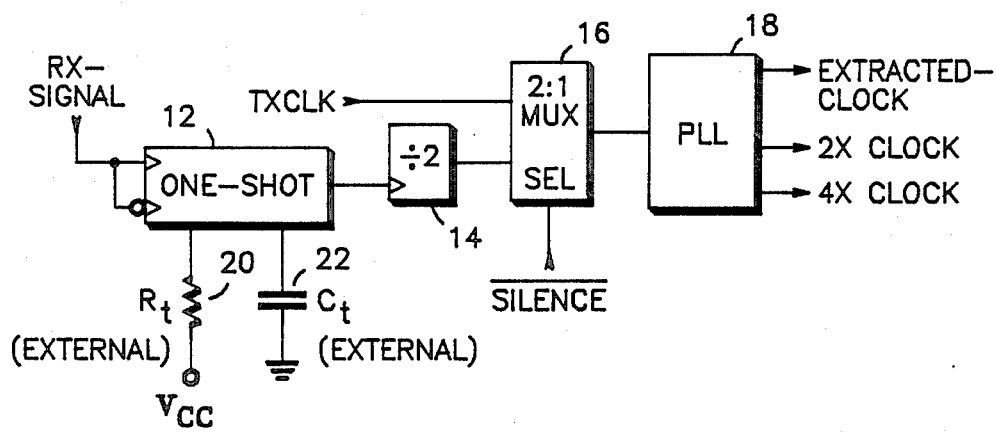

PHASE-COHERENT DEMODULATION CLOCK AND DATA RECOVERY

BACKGROUND OF THE INVENTION

The present invention relates in general to the new data communication scheme specified in the IEEE 802.4 token bus specification for local area networks. More particularly the present invention relates to a circuit and method for the demodulation of signals transmitted under such communication scheme in order to obtain both the clock signal associated therewith and the data contained in such signal.

There are prior art demodulation techniques and circuits which are used with the Ethernet (IEEE 802.3) communication scheme, however these are not suitable for use with the new data communications scheme specified in IEEE 802.4. Most of the prior art demodulation methods are not only not designed for use with this new communication scheme but involve some form of sampling of the amplitude of the signal in question in order to accomplish the demodulation. Even those methods which are implemented digitally by taking a single or multiple samples of data during a bit time are subject to errors which can occur due to the presence of noise during the time the sample is taken.

SUMMARY OF THE INVENTION

It is therefore an object of the present invention to provide a demodulation method and circuit for use with the phase-coherent signalling scheme specified in IEEE 802.4.

It is a further object of the present invention to provide a digital demodulation method and circuit for extracting the clock signal from a transmitter utilizing the phase-coherent signalling scheme of IEEE 802.4

It is still further an object of the present invention to provide a digital demodulation technique for data recovery from the signal transmitted under the coherent signalling scheme of IEEE 802.4.

The foregoing and other objects are achieved in the present invention wherein there is provided a phase-coherent demodulator comprising a time delayed one-shot having a terminal for receiving the transmitted signal, said time delay being fixed by an external resistor and capacitor coupled to the one-shot. The output terminal of the one-shot is coupled to the input of a divide-by-two circuit. The output of the divide-by-two circuit is coupled to an input of a multiplexer which also receives as an input a transmitter clock reference signal. The output of the multiplexer is coupled to a phase-locked loop circuit having extracted clock, two times clock and four times clock output terminals.

The terminal for receiving the transmitted signal is also coupled to the input terminal of a first inverter, the output terminal of which is coupled to the input terminal of a second inverter. The output terminal of the second inverter and the terminal for receiving the transmitted signal are coupled to the input terminals of an exclusive-OR gate. The two times clock terminal is coupled to the data terminal of a first D flip-flop. The four times clock terminal is coupled to the input terminal of a third inverter, the output of which is coupled to the clock terminal of the first D-flip-flop. The inverted output of the first D flip-flop is coupled to the clear terminal of a second D flip-flop and to the clock terminal of a third D flip-flop. The output terminal of the exclusive-OR gate is coupled to the clock terminal of the second D flip-flop, the data terminal of which is coupled to a logic "1". The inverted output of the second D flip-flop is coupled to the data terminal of the third D flip-flop, having an output terminal.

BRIEF DESCRIPTION OF THE DRAWINGS

FIG. 1 is a diagram of the waveforms used for both the data and non-data pairs for signals transmitted and received under the phase-coherent modulation scheme of IEEE 802.4.

FIG. 2 is a block diagram of the clock recovery portion of the demodulation circuit of the present invention.

DESCRIPTION OF THE PREFERRED EMBODIMENT

With phase-coherent modulation the data is modulated using a signaling scheme where a "1" is represented by one full cycle per bit time and a "0" is represented by two cycles per bit time. This scheme is called phase-coherent because the zero crossing points are in phase at the beginning and end of each bit time.

FIG. 1 shows an example of the modulated signals for a "1", a "0" and a pair of non-data symbols. Non-data symbols are a "violation" and are used as message delimiters.

With reference to FIG. 2 there is shown the clock recovery circuit of the present invention which includes a one-shot 12 having both inverting and non-inverting inputs for receiving the phase-coherent modulated signal. Resistor 20, for coupling to a source of supply voltage, is connected to one-shot 12. Capacitor 22, for coupling to a ground reference, is connected to one-shot 12. One-shot 12 is coupled to the input of divide-by-two circuit 14, the output of which is coupled to an input terminal of multiplexer 16. Multiplexer 16, for receiving a transmitted clock signal on a second input terminal and for receiving an inverted silence signal, is coupled to phase-locked loop (PLL) circuit 18. Phase-locked loop circuit 18 has an extracted clock output terminal, a two times clock output terminal and a four times clock output terminal.

Figure 4:
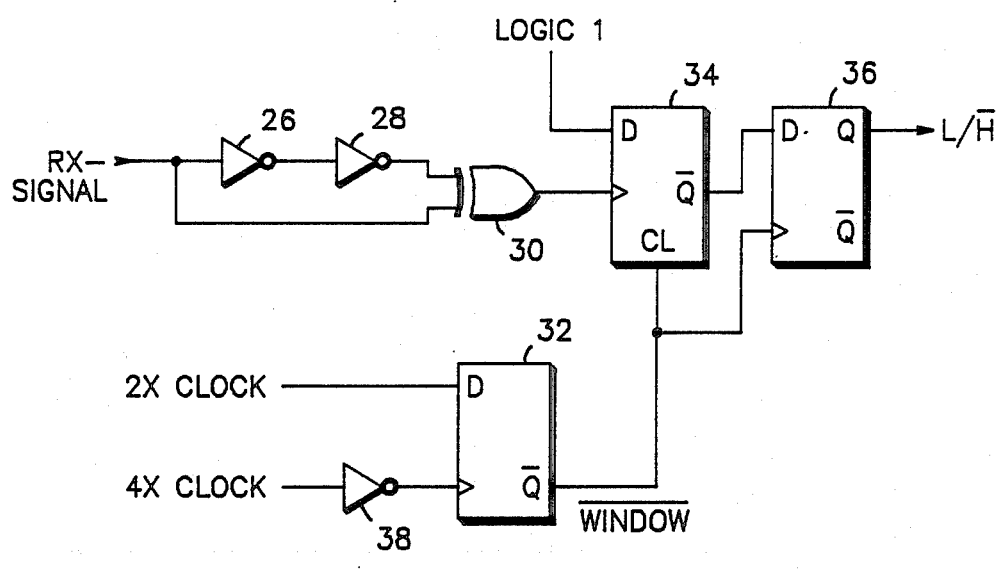
FIG. 4 is a block diagram of the data recovery portion of the demodulation circuit of the present invention.

As shown in FIG. 4, the two times clock output terminal of PLL 18 is coupled to the data terminal of D flip-flop 32 having data, clock and inverted output terminals. The four times clock output of PLL 18 is coupled to the input of inverter 38 having input and output terminals. The output of inverter 38 is coupled to the clock terminal of D flip-flop 32. The inverted output terminal of D flip flop 32 is coupled to the clear terminal of D flip-flop 34 having data, clock, clear and inverted output terminals. The input terminal to one shot 12 is also coupled to the input terminal of inverter 26 having input and output terminals. The output terminal of inverter 26 is coupled to the input terminal of inverter 28 having input and output terminals. The output terminal of inverter 28 is coupled to the first input terminal of exclusive-OR gate 30 having first and second input terminals and an output terminal. The input terminal of inverter 26 is coupled to the second input terminal of exclusive-OR gate 30. The output terminal of exclusive- OR gate 30 is coupled to the clock terminal of D flip-flop 34. A logic "1" signal is applied to the data terminal of D flip-flop 34. The inverted output terminal of D flip-flop 32 is coupled to the clock terminal of D flip flop 36 having data, clock and output terminals. The inverted output terminal of D flip-flop 34 is coupled to the data terminal of D flip-flop 36.

Figure 3:
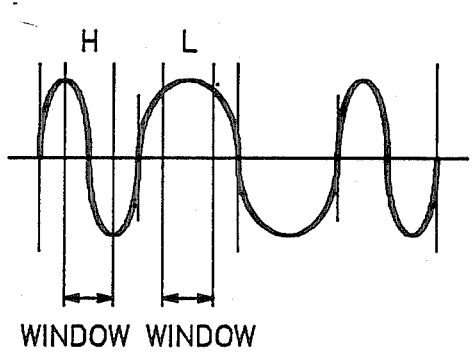
FIG. 3 is a diagram indicating that portion of the waveform where edge detection would take place in order to extract data from the transmitted signal.

In operation, the received signal is applied to the input of inverter 26 and also to one input of exclusive-OR gate 30. The combination of inverters 26 and 28 creates a slight delay such that the inputs to exclusive-OR gate 30 are different only at the crossing point of an input signal, therefore the output of exclusive-OR gate 30 will be a pulse signal which represents a zero crossing point of the transmitted signal. While this pulse signal is applied to the clock terminal of D flip-flop 34 it will only cause a reaction during those times that the clear terminal, or window signal, is low. The window which is shown in FIG. 3 is generated by combining the two times clock signal and an inverted four times clock signal in D flip-flop 32. The inverted output of D flip-flop 32 represents an inverted signal corresponding to the window shown in FIG. 3. Since this inverted signal is applied to the clear terminal of D flip-flop 34, the edge detection coming from exclusive-OR gate 30 will only be clocked through during the window period or when the inverted window signal from D flip-flop 32 is low. At the end of a given window period the inverted window signal from D flip-flop 32 will be switching from low to high which will clock D flip-flop 36 and clock through whatever signal is present at the data input terminal of D flip-flop 36 to the output terminal Q.

The two major elements of the clock recovery circuit are the monostable multivibrator (one shot) 12 and a phase-locked loop circuit 18. The one shot is used to recover the low frequency from the incoming signal. The time delay of the one shot is set to 75% of one-half the period of the data rate (this allows for maximum edge jitter). The high frequency component edges are ignored since they occur before the time delay has expired. Every one-half bit time, another edge occurs which corresponds to the low frequency component. The output of one shot circuit 12 is connected to a divide-by-two circuit 14 to obtain a square wave which is then fed to a phase-locked loop circuit 18 via a multiplexer 16. Multiplexer 16 is used to supply a frequency reference to the phase-locked loop circuit 18 and selects either the recovered clock signal or the transmitter clock signal (TXCLK) depending on whether there is in fact a valid signal being received.

Phase-locked loop 18 runs at four times the data rate and provides a continuous stable clock source to the data recovery circuit and symbol reporting to other portions of the phase-coherent modem. As indicated, the phase-locked loop input is switched between two sources via multiplexer 16. When the received signal is valid the input is the recovered clock from the incoming signal. When the received signal is not valid (i.e. silence is detected), the PLL input is sourced from the transmitter clock (TXCLK) of the modem. The transmitter clock is used to provide a steady source to the PLL. By keeping the PLL running at the data rate, the time to lock up to the incoming signal is minimized since the PLL need only acquire phase lock and not frequency lock to the new signal.

The data recovery circuit recovers the data by looking for an edge during a specific time window which is created using the extracted clock signal. The window, which is in the center of each one-half bit time, spans one-quarter bit time as shown in FIG. 3. When an edge is detected during this window, the one-half bit (physical symbol) is an H or high frequency half-bit. When no edge is detected during this window, the half-bit (physical symbol) is an L or low frequency half-bit. The half-bits are then combined to provide the data as either a "1", a "0", or a non-data symbol. The circuit of FIG. 4 therefore generates an output low at the output terminal of D flip-flop 36 when there is a zero crossing represented by the output of exclusive-OR gate 30 and this zero crossing occurs during the window which is generated by D flip-flop 32.

What has been provided therefor is a digital phase-coherent demodulation circuit including a clock extraction circuit and a data recovery circuit for demodulation of signals utilizing the phase-coherent scheme of IEEE 802.4. The above description is given by way of example only. Changes in form and details may be made by one skilled in the art without departing from the scope of the invention as defined by the appended claims.

We claim:

1. A phase-coherent demodulator for use with a transmitted signal having at least two phase-coherent frequencies comprising:
   clock recovery means for generating from said transmitted signal a clock signal which has the same frequency as the lowest of said phase-coherent frequencies; and
   data recovery means coupled to said clock recovery means for generating separate signals corresponding to said at least two phase-coherent frequencies.

2. The demodulator of claim 1 wherein said clock recovery means comprises:
   a monostable multivibrator having inverting and non-inverting input terminals and an output terminal;
   a divide-by-two circuit having input and output terminals, said input terminal of said divide-by-two circuit coupled to said output terminal of said multivibrator;
   a multiplexer having first and second input terminals and an output terminal, said first input terminal coupled to the output terminal of said divide-by-two circuit and said second input terminal for receiving a transmitter clock signal; and
   a phase-locked loop circuit having an input terminal and clock, two times clock and four times clock output terminals, said input terminal of said phase-locked loop circuit coupled to said output terminal of said multiplexer.

3. The demodulator of claim 2 wherein said data recovery means comprises:
   window generation means for generating a signal with a duration of one-quarter of the period of said clock signal during the center portion of each one-half period of said clock signal;
   edge detection means for detection of the zero crossing points of said transmitted signal; and
   combining means coupled to said window generation means and said edge detection means for generating a signal when said edge detection occurs during said window.

4. The demodulator of claim 3 wherein said edge detection means comprises:
   a first inverter having input and output terminals said input terminal of said first inverter for coupling to said transmitted signal;

a second inverter having input and output terminals, said input terminal of said second inverter coupled to said output terminal of said first inverter; and an exclusive-OR gate having first and second input terminals and an output terminal, said first input terminal coupled to said output terminal of said second inverter and said second input terminal coupled to said input terminal of said first inverter.

5. The demodulator of claim 4 wherein said window generation means comprises:

a third inverter having input and output terminals, said input terminal coupled to the four times clock output terminal of said phase-locked loop circuit; and a first flip-flop having data, clock and inverted output terminals, said data terminal of said first flip-flop coupled to the two times clock output terminal of said phase-locked loop circuit and said clock terminal of said first flip-flop coupled to said output terminal of said third inverter.

6. The demodulator of claim 5 wherein said combining means comprises:

a second flip-flop having data, clock, inverted output and clear terminals, said data terminal for coupling to a logic "1" signal, said clock terminal coupled to said output terminal of said exclusive-OR gate, and said clear terminal coupled to said inverted output terminal of said first flip-flop; and a third flip-flop having data, clock and output terminals, said data terminal of said, third flip-flop coupled to said inverted output terminal of said second flip-flop, said clock terminal of said third flip-flop coupled to said clear terminal of said second flip-flop and said output terminal for providing an output signal.

7. A method for demodulation of a transmitted signal having at least two phase-coherent frequencies comprising the steps of:

recovering from said transmitted signal a clock signal having a frequency corresponding to the lowest of said phase-coherent frequencies;

detecting the zero crossing points of said transmitted signal;

generating a window signal of a duration equal to one-quarter of the period of said clock frequency during the center portion of each one-half period of said clock signal; and generating a data signal corresponding to an edge detection which occurs while said window signal is present.

* * * * *